March 30, 1948. C. E. A. O'LOUGHLIN 2,438,517
GAUGE KNIFE
Filed Dec. 23, 1944

Inventor:
CHARLES E. A. O'LOUGHLIN
By Chas. C. Reif.
Attorney

Patented Mar. 30, 1948

2,438,517

UNITED STATES PATENT OFFICE 2,438,517

GAUGE KNIFE

Charles E. A. O'Loughlin, St. Paul, Minn.

Application December 23, 1944, Serial No. 569,445

4 Claims. (Cl. 30—279)

This invention relates to a paring or scraping tool, and particularly to a gauge tool adapted for use by either right or left-handed operators.

It is an object of this invention to provide a very simple, efficient and inexpensive paring or scraping tool having spaced blades with cutting edges facing in substantially opposite directions and having gauge portions spaced from said blades transversely thereof and extending longitudinally of said blades, said portions preferably having curved convex surfaces at the sides adjacent said blades.

It is also an object of the invention to provide such a tool as set forth in the preceding paragraph, the same being formed of one integral piece of material and having a substantially cylindrical eye-cutting and coring member at one end adjacent said blades, the same being disposed centrally of said blades and having its axis extending at substantially right angles to the edges of said blades.

It is still further an object of the invention to provide a gauge paring or scraping tool adapted for use by right and left-handed operators, the same being formed of one piece of sheet metal and having spaced blades with cutting edges facing in substantially opposite directions, gauge portions extending longitudinally of said blades and spaced from said blades transversely thereof and extending away from said blades in curved formation, said piece having a handle portion extending at one end spaced from said blades and disposed centrally thereof.

It is more specifically an object of the invention to provide a paring, scraping and coring tool formed of one integral piece of material, said piece having spaced blades punched therefrom, having cutting edges diverging slightly toward one end of said piece, said piece being of angular inverted trough shape between said blades, gauge portions extending longitudinally of said blades respectively and spaced therefrom transversely of said blades, said gauge portions extending away from said blades in curved form with their convex sides adjacent said blades, said piece having a handle formed therein extending longitudinally at one end of said blades and centrally thereof, said handle having upper convex sides and end, said piece having also a substantially cylindrical eye-cutting and coring member formed at the end thereof opposite said handle and disposed centrally of said blades, the same having its axis extending substantially at right angles to said edges.

These and other objects and advantages of the invention will be fully set forth in the following description made in connection with the accompanying drawings in which like reference characters refer to the same parts throughout the several views and in which.

Figure 1:
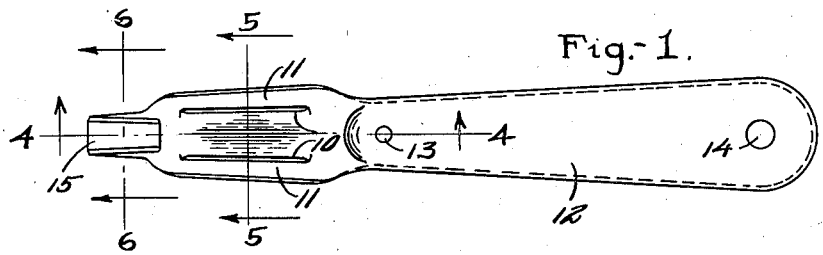
Fig. 1 is a top plan view of said tool.
Figure 4:
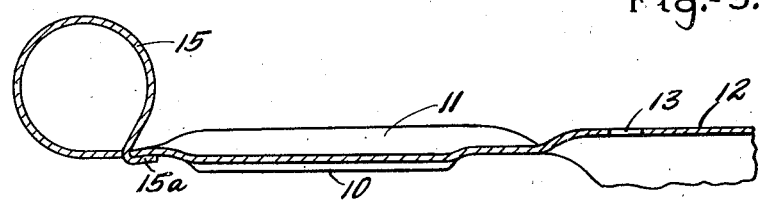
Fig. 4 is a partial vertical section taken on line 4—4 of Fig. 1.
Figure 5:
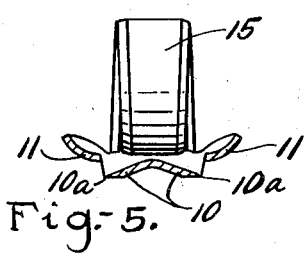
Fig. 5 is a vertical section taken on line 5—5 of Fig. 1.
Figure 6:
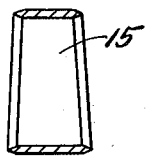
Fig. 6 is a vertical section taken on line 6—6 of Fig. 1.
Figure 7:
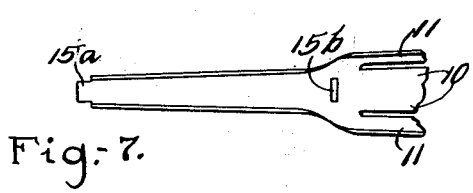
Fig. 7 is a partial plan view of the blank used in forming said tool.

Referring to the drawings, a tool is shown having spaced blades 10. Blades 10 are provided with sharpened cutting edges 10a facing in substantially opposite directions. While blades 10 could be variously formed, in the embodiment of the invention illustrated, they are formed of one piece of material, and as shown in Fig. 5 this piece of material is of inverted angular trough shape between said blades. The bottom of said trough is thus disposed upwardly. A gauge portion 11 is provided for each blade, and as shown in Fig. 5 each portion 11 is spaced from its blade 10 transversely of said blade, the same extending longitudinally of said blade substantially parallel thereto and extending away from said blade in curved form. The convex side of each gauge portion 11 is at the side thereof adjacent its blade. In the embodiment of the invention shown in Figs. 1 and 2, the tool is made from an integral piece of sheet metal. It will be noted that the blades 10 diverge slightly toward one end of the tool and a handle portion 12 extends from said end longitudinally of and centrally of blades 10. Handle 12 is shown as provided with spaced holes 13 and 14. Handle 12 has its side edges diverging towards its outer end and said handle is of inverted trough shape, the sides and end thereof being curved with their convex sides upwardly. The integral piece of metal from which the tool is made has formed at one end thereof opposite the handle and a substantially cylindrical eye-cutting and coring member 15. Member 15 has its axis extending at substantially right angles to the edges of blades 10, and the circular edges at each side of member 15 are sharpened, as shown in Figs. 1 and 6. The width of member 15 increases from its inner to its outer side. A portion of the blank from which the tool is made is shown in Fig. 7 and is in its form before the member 15 has been formed thereon. Member 15 is curved inwardly into the form shown in Figs. 1, 2 and 4, and the blank has a portion 15a of reduced width which is inserted into a slot 15b in the blank and then bent parallel with and into engagement with the under-surface of the blank, as shown in Fig. 4. Member 15 is thus of continuous closed form. As shown in Fig. 7, the blank tapers outwardly from adjacent slot 15b to the portion 15a.

Figure 3:
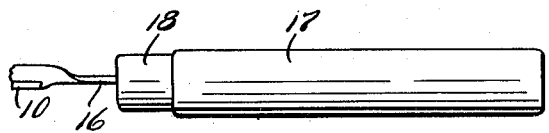
Fig. 3 is a partial view in side elevation showing a modification.

In Fig. 3 a tool is shown having a different form of handle. In this form the piece of metal in which portions 10 and 11 are formed will have a projecting tapered end 16 of reduced width and this is inserted into a handle 17 made of wood, plastic or other material and of cylindrical form. A ferrule 18 is forced over a reduced end of handle 17 at the end which portion 16 enters. A convenient and comfortable handle is thus provided and one which can be finished in a pleasing and ornamental manner.

From the above description it will be seen that I have provided a very simple and efficient tool and one which can be inexpensively produced. In operation the operator holds the handle and will pare a vegetable or fruit by moving one of the edges 10a along the periphery of the same. The depth to which the peel is removed will be determined by the gauge members 11. Since there is a knife or blade 10 facing each way, the tool can be used by either a right-handed or left-handed operator. The two blades have a further function in that one can be used to peel a vegetable such as a potato or sweet potato, and the other can be used for scraping. In peeling, it is the customary practice to move the blade toward the operator. In scraping, on the other hand, it is the common practice to move the blade away from the operator. The operator can thus change from a peeling operation to a scraping operation by merely reversing the movement of the tool. The blade adjacent the operator will be used for peeling and the opposite blade can very conveniently be used for scraping. It is a common practice to scrape certain vegetables such as celery, sweet potatoes and carrots. By using the blades and the gauge members the tool can also be used to make strips of potato, carrots, cabbage, celery, etc., for salad. This can be done by moving the tool in either direction.

Figure 2:
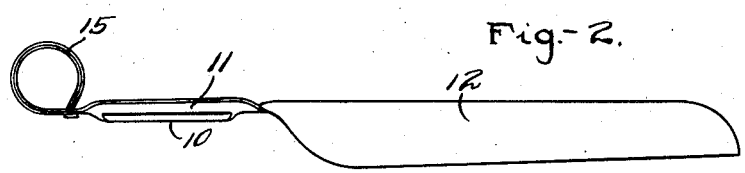
Fig. 2 is a view in side elevation of said tool.

The member 15 has high utility in removing eyes from potatoes, cores from apples or pears, and dark or bad spots from any fruit or vegetable. It will thus be seen that all of the necessary operations in paring, cutting up or coring various fruits and vegetables can be performed by the tool. The member 15 is disposed for efficient operation and the core or other piece can be removed from a fruit or vegetable by a simple twisting and lifting movement. It will be noted that the blades 10 diverge somewhat toward the handle portion of the tool and a draw cut can thus be made. The member 15 being of greatest width at its outer end also makes the cutting therewith somewhat easier. The outer portion enters the vegetable first and a draw cut in effect is had. The tool as shown in Figs. 1 and 2 can be easily and quickly stamped or pressed out of a single piece of material. The tool can be conveniently hung on a nail, hook or other support by passing opening 14 over said support.

It will, of course, be understood that various changes may be made in the form, details, arrangement and proportions of the apparatus and in the steps and sequence of steps of the method without departing from the scope of applicant's invention, which, generally stated, consists in a method and apparatus capable of carrying out the objects above set forth, such as disclosed and defined in the appended claims.

What is claimed is:

1. A gauge paring tool formed of one integral piece of material and comprising spaced blades punched from said piece having sharpened edges facing in opposite directions, gauge portions concavo-convex form in transverse cross section adjacent and spaced from the remote sides of said blades respectively, the same being of curved form having convex sides adjacent said blades, and a handle of concavo-convex form in transverse cross section extending at one end of said piece centrally of said blades and curved oppositely to said gauge members and having a concavo-convex outer end.

2. A gauge paring tool comprising an integral piece of sheet metal, the same having spaced blades punched therefrom and having sharpened edges facing in substantially opposite directions, gauge portions adjacent said blades extending longitudinally thereof and having convex surfaces at the sides adjacent said blades, said blades diverging slightly toward one end, said piece having a handle formed at said end, said handle being in the form of a trough and having convex sides and end, the bottom of said trough being in substantially the same plane as the inner edges of said gauge portions.

3. A gauge paring tool comprising an integral piece of sheet metal, the same having spaced blades punched therefrom, said blades having sharpened edges facing in substantially opposite directions, said piece being of angular inverted trough shape between said blades, gauge portions extending longitudinally of said blades and spaced therefrom transversely of said blades, the same extending away from said blades and having convex surfaces at the sides adjacent said blades, said piece having a handle at one end spaced a short distance from said blades, the top surface of said handle being in substantially the same plane as the bottom of said trough between said blades and extending downwardly from said plane in curved form at its sides and end.

4. A gauge paring tool comprising an integral piece of sheet metal, the same having spaced blades punched therefrom, said blades having sharpened edges facing in substantially opposite directions, said piece being of angular inverted trough shape between said blades, gauge portions extending longitudinally of said blades and spaced therefrom transversely of said blades, the same extending away from said blades and having convex surfaces at the sides adjacent said blades, said piece having a handle at one end spaced a short distance from said blades.

CHARLES E. A. O'LOUGHLIN.

REFERENCES CITED

The following references are of record in the file of this patent:

UNITED STATES PATENTS

| Number | Name | Date |
|---|---|---|
| 440,705 | Gates | Nov. 18, 1890 |
| 751,567 | Search | Feb. 9, 1904 |
| 2,291,179 | Woginrich | July 28, 1942 |
| 1,010,554 | White | Dec. 5, 1911 |
| 1,739,517 | O'Loughlin | Dec. 17, 1929 |